No. 616,268.　　　　　　　　　　　　　　　Patented Dec. 20, 1898.
F. P. SNOW.
BICYCLE GEARING.
(Application filed Oct. 13, 1897.)
(No Model.)　　　　　　　　　　　　　　　2 Sheets—Sheet 1.
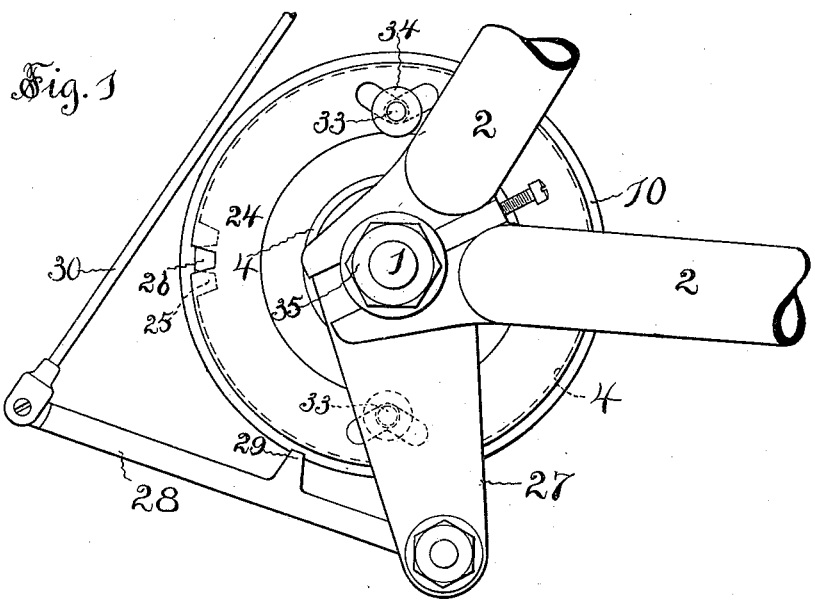
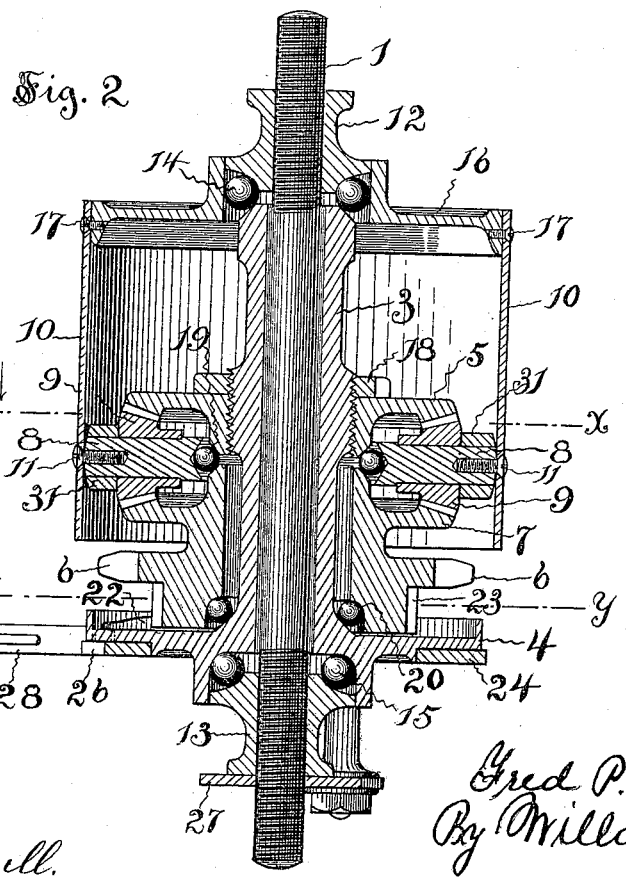
Witnesses
E. J. Hyde.
E. W. Fothergill.
Inventor
Fred P. Snow,
By Millard Eddy,
Attorney
THE NORRIS PETERS CO., PHOTO-LITHO., WASHINGTON, D. C.

No. 616,268. Patented Dec. 20, 1898.
F. P. SNOW.
BICYCLE GEARING.
(Application filed Oct. 13, 1897.)

(No Model.) 2 Sheets—Sheet 2.

Witnesses
E. J. Hyde.
E. W. Fothergill.

Inventor
Fred P. Snow,
By Willard Eddy,
Attorney

UNITED STATES PATENT OFFICE.

FRED P. SNOW, OF LYNN, MASSACHUSETTS, ASSIGNOR, BY DIRECT AND MESNE ASSIGNMENTS, TO THE STANTON MANUFACTURING COMPANY, OF BOSTON, MASSACHUSETTS.

BICYCLE-GEARING.

SPECIFICATION forming part of Letters Patent No. 616,268, dated December 20, 1898.

Application filed October 13, 1897. Serial No. 655,022. (No model.)

*To all whom it may concern:*

Be it known that I, FRED P. SNOW, of Lynn, Essex county, Massachusetts, have invented certain new and useful Improvements in Bicycle-Gearing, which improvements are described in the following specification and are illustrated by the accompanying drawings.

My invention relates to that class of gearing for bicycles and other like vehicles by which the wheel is driven, at the pleasure of the driver, either at one or the other of two predetermined rates of speed relative to the rate of pedaling.

My object is to produce a good practical two-speed gear of this kind compact and not liable to get out of order. To accomplish this object, I place in the hub of the driving-wheel a gear-wheel that is united with the sprocket-wheel, a gear-wheel that is locked to the sprocket-wheel and to the bicycle-frame alternately, and a gyratory pinion which engages the gear-wheels and is mounted upon a spider to which the shell of the hub is made fast. The operation of the invention is such that the driving-wheel to which it is applied may itself be driven either in unison with the sprocket-wheel or in unison with such pinion-carrying spider, according to the changing conditions of travel or the pleasure of the cyclist.

The best manner in which I have contemplated applying the principles of my invention is shown in said drawings, by which the invention is illustrated.

Figure 3:
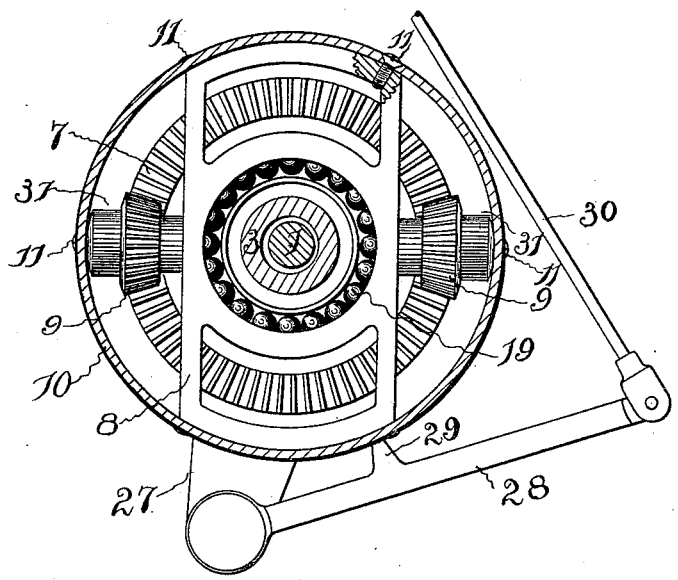
Figure 4:
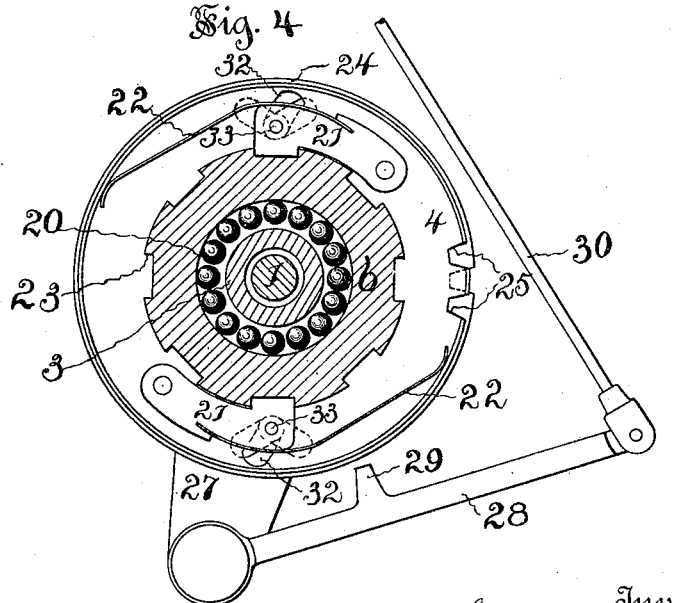

Figure 1 is a side view of a portion of a bicycle and includes an end view of the hub of the driving-wheel, all constructed in accordance with the requirements of my invention. Fig. 2 is an axial section of Fig. 1. Fig. 3 is a cross-section of the hub, taken on the broken line $x$ $x$ of Fig. 2 and viewed in the direction of the arrows in that figure. Fig. 4 is a like section of the hub on the broken line $y$ $y$ of Fig. 2.

In the views the numeral 1 denotes the axle of the driving-wheel, to which my invention is applied. This axle is stationary, being part of the bicycle-frame 2 or rigidly attached to that frame, as indicated in Fig. 1. On this axle is a rotary sleeve 3, which is provided with a flange 4 and with a beveled gear-wheel 5, the latter being fixed stationarily upon the sleeve by means of check-nut 18, as shown in Fig. 2. A similar gear-wheel 7 and the sprocket-wheel 6, which are either connected rigidly with each other or are preferably united in one piece, are placed rotatably upon the same sleeve. Between these gear-wheels is a rotatable spider 8, upon which is journaled a pinion or a pair of pinions 9, duplicates of each other, engaging the gear-wheels continually and held down to their work by collars 31. The external shell 10 of the hub is made fast to this spider by screws 11 and is provided with an annular head 16, to which it is made fast by screws 17. Sleeve 3 is held in position upon the axle by nuts 12 and 13 and by intermediate ball-bearings 14 and 15. The same ball-bearing 14 facilitates the rotation of the annular head 16. In like manner a duplex ball-bearing 19 permits free rotation of spider 8 relatively to the gear-wheels and of the gear-wheels relatively to each other, while a ball-bearing 20 reduces friction between the flanged shell 3 and the sprocket-wheel 6. On the inner face of flange 4 are placed pawls 21, which are provided with engagement-springs 22, as shown in Fig. 4, and are adapted to engage sprocket-wheel 6 by means of notches 23 on the hub of that wheel. Pawls 21 are also provided with pins 33, extending through slots 32 in flange 4, while on the outer face of the same flange, as seen in Fig. 1, is seated an annular cam 24, engaging said pawls by means of said pins 33, and held to its seat by the heads 34 of those pins. For locking purposes flange 4 and cam 24 are provided with peripheral notches 25 and 26, which are shown in full lines in Figs. 4 and 1, respectively, while a dog 28, having a tooth 29 adapted to enter those notches, is pivoted to a hanger 27, dependent from axle 1. In order that dog 28 may be made to engage and to disengage the flange 4 and the cam 24, some suitable mechanism for actuating the dog, although not shown in the drawings, is connected with that dog by rod 30 and is arranged within easy reach of the rider. It is to be understood that the spokes of the driving-wheel, though not shown in the drawings, are attached to shell 10 in some usual or convenient manner.

Such being the construction of my improved two-speed gear its mode of operation is simple and obvious. When dog 28 occupies a position of disengagement, as shown in the drawings, the pawls 21, being actuated solely by springs 22, engage the sprocket-wheel 6 by means of notches 23, as shown in Fig. 4. Then the sprocket-wheel, being locked to flange 4 and so imparting its own rate of rotation to sleeve 3, drives the hub in unison with itself; but whenever dog 28 is raised to its position of engagement (not shown in the drawings) cam 24 is stopped by the entering of tooth 29 into notch 26. By the consequent raising of pawls 21 out of notches 23 the described engagement between sprocket-wheel 6 and sleeve 3 is released, while by the entrance of tooth 29 into one of the notches 25 on the periphery of flange 4 the rotation of that sleeve is stopped. The consequent rotation of the driving gear-wheel 7 relatively to the stationary gear-wheel 5 imparts to pinion 9, which rolls between them, not only a rotary motion about its own axis, but also an orbital motion around sleeve 3. By virtue of this orbital motion, which is transmitted to shell 10 through spider 8, the hub is driven in unison with the pinion, and the driving-wheel of the bicycle is revolved with an angular velocity equal to one-half that of the sprocket-wheel, so by the mere manipulation of the mechanism that actuates dog 28 the rider of the bicycle is enabled by this invention to impart to the driving-wheel of his vehicle either the full rate of rotation of the sprocket-wheel or one-half that rate, as he may please, or as the conditions of travel may require. This mode of operation presents the important advantage that the gears are brought into operation only when the speed is reduced, and consequently the friction is least when the speed is greatest.

The essence of the invention does not lie in the number of the gyratory pinions 9, for the mode of operation would be the same if the number of those duplicate pinions should be increased or diminished, nor in the cogs that are cut upon the gear-wheels and pinions, for obviously the same engagements might be effected between them by other equivalent frictional mechanism.

That which I claim as my invention is—

1. A stationary axle, a sleeve and a gear-wheel, which are connected to rotate in unison on said axle, a sprocket-wheel and a gear-wheel, which are connected to rotate in unison on said sleeve, a rotary spider on said sleeve, and a pinion, which is journaled on said spider, and continually engages both said gear-wheels, in combination with a hub-shell, which is made fast to the spider, and alternate locking mechanism, whereby all the rotary parts of the hub may be fastened to revolve in unison, and whereby the first-mentioned gear-wheel may be fastened so as not to rotate at all, substantially as and for the purpose specified.

2. In the driving-wheel of a bicycle or other like vehicle, an axle that is made fast to the frame of such vehicle, a sleeve which is rotatable on that axle, a sprocket-wheel and a gear-wheel, which are united with each other, and are rotatable on said sleeve, a stationary gear-wheel on said sleeve, a spider that is rotatable on said sleeve, and a pinion, journaled on said spider, and continually engaging said gear-wheels, in combination with a rotary cylindrical shell, made fast to said spider, and mechanism for locking said sleeve alternately to the sprocket-wheel and to the frame of the vehicle, substantially as and for the purpose specified.

3. A stationary axle, a rotary sleeve thereon, a sprocket-wheel and a gear-wheel, connected to rotate in unison on said sleeve, a stationary gear-wheel on the same sleeve, a spider that is rotatable on said sleeve, a pinion, journaled on said spider, and engaging both said gear-wheels, a rotary shell, made fast to said spider, a notched flange on said sleeve, and one or more pawls, mounted on said flange, and adapted to engage the sprocket-wheel, in combination with a notched cam, actuating said pawls, and a dog to catch said flange and said cam, substantially as and for the purpose specified.

4. A stationary axle, a sleeve and gear-wheel, which are connected to rotate in unison on said axle, a sprocket-wheel and a gear-wheel, which are connected to rotate in unison on said sleeve, a pinion, which meshes continually with both said gear-wheels, and a hub-shell, to which the journal of said pinion is made fast, in combination with alternate locking mechanism, substantially as and for the purpose specified.

In testimony whereof I hereunto set my name in the presence of two witnesses.

FRED P. SNOW.

Witnesses:
 GEO. C. BURGESS,
 HARRY T. DODSWORTH.